US012105377B2

(12) United States Patent
Shi et al.

(10) Patent No.: US 12,105,377 B2
(45) Date of Patent: Oct. 1, 2024

(54) LIGHTING UNIT WITH ZONAL ILLUMINATION OF A DISPLAY PANEL

(71) Applicant: Meta Platforms Technologies, LLC, Menlo Park, CA (US)

(72) Inventors: Zhimin Shi, Bellevue, WA (US); Jian Xu, Redmond, WA (US); Yijing Fu, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/076,223

(22) Filed: Dec. 6, 2022

(65) Prior Publication Data

US 2023/0418105 A1 Dec. 28, 2023

Related U.S. Application Data

(60) Provisional application No. 63/355,547, filed on Jun. 24, 2022.

(51) Int. Cl.
*G02F 1/1335* (2006.01)
*F21V 8/00* (2006.01)
*G02F 1/13357* (2006.01)

(52) U.S. Cl.
CPC ..... *G02F 1/133607* (2021.01); *G02B 6/0006* (2013.01); *G02B 6/0008* (2013.01); *G02F 1/133524* (2013.01); *G02F 1/133621* (2013.01)

(58) Field of Classification Search
CPC ......... G02F 1/133524; G02F 1/133607; G02B 6/0006; G02B 6/0008
See application file for complete search history.

(56) References Cited

U.S. PATENT DOCUMENTS

2018/0188691 A1* 7/2018 Fattal ................. G02B 6/12
2020/0379268 A1* 12/2020 Tan .................. G02B 27/106

* cited by examiner

*Primary Examiner* — Sean P Gramling
(74) *Attorney, Agent, or Firm* — Greenberg Traurig, LLP (57) ABSTRACT

A lighting unit for a display panel includes a light distribution module, an array of out-couplers, and a beam spot array generation module. The light distribution module includes a plurality of output waveguides for configurably distributing illuminating light between the output waveguides. Each out-coupler is coupled to an output waveguide and configured to out-couple a portion of the illuminating light to propagate towards the display panel. The beam spot array generation module is configured to receive portions of the illuminating light out-coupled by out-couplers of the array of out-couplers and to convert each portion to illuminate a zone of the display panel with an illuminating light field comprising an array of light spots. Each light spot is configured for illuminating an individual pixel or sub-pixel of the zone of the display panel.

20 Claims, 12 Drawing Sheets

LIGHTING UNIT WITH ZONAL ILLUMINATION OF A DISPLAY PANEL

REFERENCE TO RELATED APPLICATION

The present application claims priority from a U.S. provisional patent application No. 63/355,547, entitled "Lighting Unit with Zonal Illumination of a Display Panel", filed on Jun. 24, 2022, and incorporated herein by reference in its entirety.

TECHNICAL FIELD

The present disclosure relates to optical devices, and in particular to visual displays and lighting units therefor.

BACKGROUND

Visual displays provide information to viewers including still images, video, data, etc. Visual displays have applications in diverse fields including entertainment, education, engineering, science, professional training, advertising, to name just a few examples. Some visual displays, such as TV sets, display images to several users, and some visual display systems, such s near-eye displays or NEDs, are intended to display images to individual users.

An artificial reality system may include an NED, e.g. a headset or a pair of glasses, configured to present content to a user, and optionally a separate console or a controller. The NED may display virtual objects or combine images of real objects with virtual objects in virtual reality (VR), augmented reality (AR), or mixed reality (MR) applications. For example, in an AR system, a user may view both images of virtual objects, e.g. computer-generated images or CGIs, and the surrounding environment by seeing through a "combiner" component. The combiner of a wearable display is typically transparent to external light but includes some light routing property to direct the display light into the user's field of view.

Because a display of HMD or NED is usually worn on the head of a user, a large, bulky, unbalanced, and/or heavy display apparatus would be cumbersome and uncomfortable for the user to wear. Head-mounted display devices require compact and efficient illuminators that provide a uniform, even illumination of a display panel or other objects or elements in the display system. Overall wall plug efficiency of a display illuminator may be negatively impacted by low optical throughput of a display panel due to the panel's geometry and wavelength and polarization selectivity.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of their structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A-1B, 2A-2B, FIG. 3, 4, 7, and FIG. 8, similar reference numerals denote similar elements.

A visual display device may include a display panel having an array of light valve pixels. The display panel may be coupled to a lighting unit. The lighting unit may utilize semiconductor light sources such as light-emitting diodes (LEDs) or laser diodes (LDs), or other suitable sources.

LED-based lighting units often rely on diffusers to obtain a uniform illumination of the display panel surface. Diffusers may introduce extra optical losses and add weight and thickness to the display device. Side-coupled lightguides, including pupil-replicating lightguides, may provide illumination that is not entirely uniform. Lasers, with their high directionality, brightness, and spectral purity, may be beneficial as light sources for a lighting unit of a display device. Laser-based lighting units and illuminators, however, may exhibit speckle pattern and interference fringing effects that worsen the illumination uniformity.

In accordance with this disclosure, a lighting unit for a display panel may be based on a photonic integrated circuit (PIC) having an active photonic integrated circuit (APIC) with optional built-in electronic circuitry. The lighting unit may include a dynamic light distribution module for distributing illuminating light between different output waveguides, a set of out-couplers coupled to the output waveguides, each out-coupler corresponding to an illumination zone of the display panel, and a beam spot generation module that converts each out-coupled light beam into an array of tightly focused spots for illuminating individual (sub)pixels of the display panel, providing an overall practical and manufacturable solution for high-performance illumination of display panels.

In accordance with the present disclosure, there is provided a lighting unit for a display panel. The lighting unit includes a light distribution module comprising a plurality of output waveguides for configurably distributing illuminating light between the output waveguides, and an array of out-couplers. Each out-coupler is coupled to an output waveguide of the plurality of output waveguides and configured to out-couple a portion of the illuminating light to propagate towards the display panel. A beam spot array generation module is configured to receive portions of the illuminating light out-coupled by out-couplers of the array of out-couplers, and to convert each portion to illuminate a zone of the display panel with an illuminating light field comprising an array of light spots. Each light spot is configured for illuminating an individual pixel or sub-pixel of the zone of the display panel.

The array of light spots of each illuminating light field may include many light spots, e.g. at least 9 light spots, or at least 81 light spots. The plurality of output waveguides of the light distribution module may include various types of waveguides, including for example and without limitation a rib waveguide, a ridge waveguide, a slot waveguide, an anti-resonant reflecting optical waveguide (ARROW) waveguide, a strip-loaded waveguide, a buried waveguide, a laser-written waveguide, an ion-diffusion waveguide, and/or a holographically defined waveguide. Furthermore, in some embodiments, the plurality of output waveguides may include a multilayer waveguide for transversely confining light field to propagate along a pre-defined direction in the plane of the chip. The light distribution module may include e.g. a fiber-based beam splitter, an on-chip star coupler, a multimode interference (MMI) coupler, a Mach-Zehnder interferometer (MZI) coupler, a Y-splitter, a resonator based coupler, and/or a photonic crystal based coupler.

The light distribution module may include e.g. an arrayed waveguide grating (AWG), a directional coupler, a ring resonator, an unbalanced Mach-Zehnder interferometer (MZI), a photonic crystal cavity, and/or an inverse design-based photonic integrated circuit (PIC). The light distribution module may include a subset of the plurality of output waveguides for each color channel of a plurality of color channels of the illuminating light. The light distribution module may include at least one tunable element comprising e.g. an electro-optic material, a thermo-optic material, a mechanical moving part, a micro-fluidic channel, and/or a liquid crystal (LC) material. The beam spot array generation module may include e.g. a diffractive optical element, a metasurface, a holographic optical element, and/or a polarization volume holographic element.

In some embodiments, the lighting unit includes a stack of: a first layer comprising the plurality of output waveguides and the array of out-couplers; and a second layer comprising the beam spot array generation module. The lighting unit may further include a phase scrambler downstream of the beam spot array generation module for scrambling optical phase of the illuminating light fields between different zones of the display panel. Each out-coupled portion of the illuminating light may be contiguous.

In accordance with the present disclosure, there is provided a display device comprising a display panel comprising a plurality of light valve pixels, and a lighting unit of this disclosure for illuminating the display panel. The display device may further include a light source for providing the illuminating light to the light distribution module, the light source including e.g. a laser diode, a fiber laser, a vertical cavity surface-emitting laser (VCSEL), a heterogeneously integrated laser, a superluminescent light-emitting diode (SLED), and/or a non-linearly converted light source.

A connector may couple the light source to the light distribution module. The connector may include e.g. an optical fiber, a nanowire, a free-space edge coupler, and/or a waveguide grating coupler. The display device may further include controller circuitry for tuning the tunable element to provide configurable zonal illumination to the display panel. The controller circuitry may be integrated into the light distribution module.

In accordance with the present disclosure, there is further provided a method for zonal illumination of a display panel. The method includes configurably distributing illuminating light between output waveguides of a plurality of output waveguides, out-coupling a portion of the illuminating light from each output waveguide to propagate towards the display panel, and converting each out-coupled portion to illuminate a zone of the display panel with an illuminating light field comprising an array of light spots, each light spot configured for illuminating an individual pixel or sub-pixel of the zone of the display panel. The method may further include changing a distribution of the illuminating light between the output waveguides to reconfigure the zonal illumination of the display panel. The zones of the display panel may overlap one another.

Figure 1A:
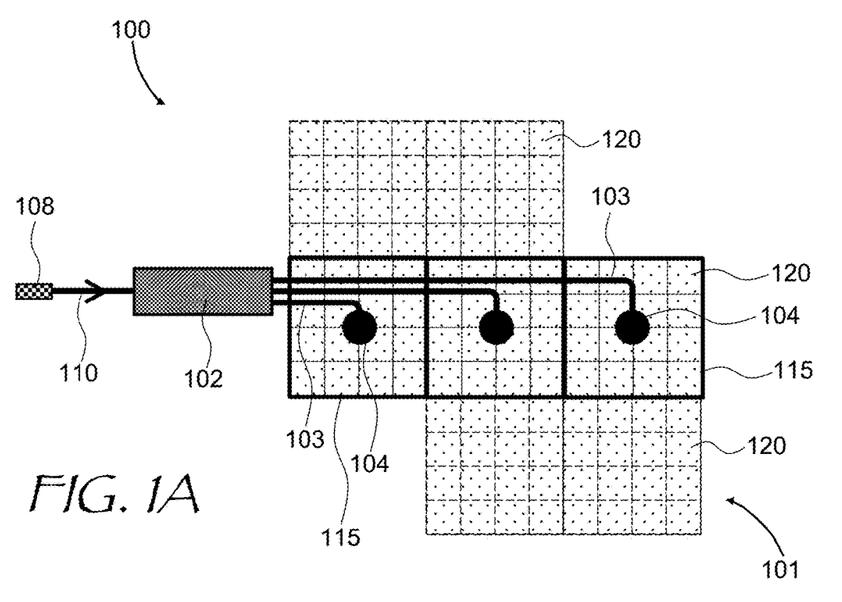
FIG. 1A is a schematic top view of a lighting unit for a display panel, in accordance with the present disclosure.
Figure 1B:
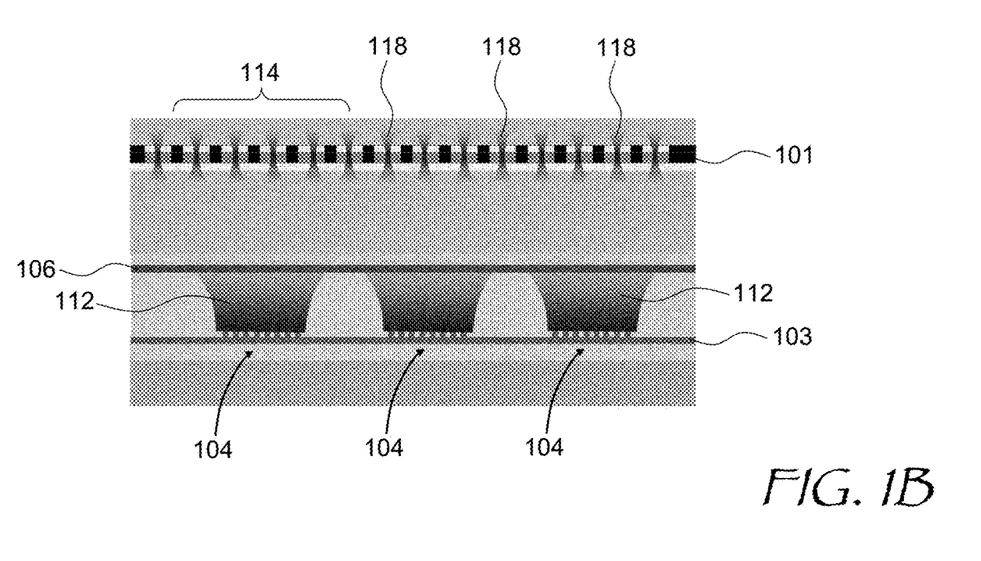
FIG. 1B is a side cross-sectional view of the lighting unit of FIG. 1A.

Referring now to FIGS. 1A and 1B, a lighting unit 100 for a display panel 101 includes a light distribution module 102, an array of out-couplers 104 e.g. grating-based out-couplers, and a beam spot array generation module 106 (FIG. 1). A light source 108 (FIG. 1A), e.g. a laser-based light source providing nearly-coherent light at one wavelength, or several wavelengths of the visible part of the spectrum corresponding to individual color channels, may provide illuminating light 110 to the light distribution module 102. The light distribution module 102 includes a plurality of output waveguides 103. The light distribution module 102 is configured to controllably and variably distribute the illuminating light 110 between individual output waveguides 103 of the plurality of output waveguides 103, in accordance with a required illumination configuration of the display panel 101.

Each out-coupler 104 (FIGS. 1A, 1B) is coupled to an output waveguide 103 of the plurality of output waveguides 103 of the light distribution module 102. Only three output waveguides 103 are shown in FIG. 1A for brevity. Any of the output waveguides 103 may include, for example and without limitation, a rib waveguide, a ridge waveguide, a slot waveguide, an anti-resonant reflecting optical waveguide (ARROW) waveguide, a strip-loaded waveguide, a buried waveguide, a laser-written waveguide, an ion-diffusion waveguide, and/or a holographically defined waveguide. Furthermore, in some embodiments, the plurality of output waveguides may include a multilayer waveguide for transversely confining light field to propagate along a pre-defined direction in the plane of the waveguide substrate, i.e. in the plane of the chip. Each out-coupler 104 is configured to out-couple a contiguous portion 112 of the illuminating light 110, i.e. a continuous, non-patterned light beam or light spot, to propagate towards the beam spot array generation module 106 and further to the display panel 101, as illustrated with upwardly expanding gray shapes in FIG. 1B. The beam spot array generation module 106 is disposed downstream of the array of out-couplers 104 w.r.t. the illuminating light 110. The beam spot array generation module 106 is configured to receive the contiguous portions 112 of the illuminating light 110 out-coupled by the out-couplers 104, and to convert each contiguous portion 112 to illuminate a zone 115, i.e. a portion of a total area of the display panel 101, with an illuminating light field 114. The zones 115 are shown in FIG. 1A as solid rectangles.

The illuminating light field 114 is non-continuous, or patterned. In the example shown in FIG. 1B, the illuminating light field 114 includes a plurality of light spots 118. Each light spot 118 is configured for illuminating an individual pixel or sub-pixel 120 of the zone 115 of the display panel 101. Each light spot 118 may be smaller in size that the corresponding (sub)pixel. Each zone 115, which may be square, rectangular, oval, etc., may include a plurality of individual pixels 120. For example, in FIG. 1A, each zone 115 includes sixteen pixels 120 (4×4 pixels). Individual zones 115 may overlap. Accordingly, each illuminating light field 114 includes sixteen light spots 118. In some embodiments, the number of spots may also be smaller, e.g. at least 9 spots. In some embodiments, the number of light spots is larger, e.g. 81 light spots, which may correspond to a 9×9 pixel zone for example, or larger. Each illuminating light field 114 is provided by a corresponding portion of the beam spot array generation module 106 from a corresponding portion 112 of the illuminating light 110 out-coupled by a corresponding out-coupler 104.

In some embodiments, the light distribution module 102 may be implemented as a photonic integrated circuit (PIC), and may include tunable and/or switchable elements, e.g. 2×2 tunable splitters arranged into a multi-output light distribution unit as a binary tree of tunable splitters, or in another suitable configuration, to provide a required degree of tunability of the portions of the illuminating light 110 distributed between different output waveguides 103. The purpose of the tunability of a magnitude (i.e. amplitude, or optical power level) of the light portions is to provide a flexible and tunable zonal illumination of the display panel 101. The light distribution module 102, together with the plurality of output waveguides 103 and the out-couplers 104, may be provided in a same PIC structure, which may include a plurality of layers. The light distribution module 102 may include a fiber-based beam splitter, an on-chip star coupler, a multimode interference (MMI) coupler, a Mach-Zehnder interferometer (MZI) coupler, a Y-splitter, a resonator based coupler, a photonic crystal based coupler, etc.

The purpose of the beam spot array generation module 106 is to provide the light field 114 with its array of the discrete light spots 118 from each contiguous portion 112 of the illuminating light 110, as explained above. The light field 114 may be provided, for example, by a diffractive optical element, e.g. a holographic optical element and/or a polarization volume holographic element, a 1D or 2D diffraction grating, a metamaterial structure, etc., that forms the light fields 114 by optical interference/diffraction of the contiguous portions 112 by the diffractive optical element. The beam spot array generation module 106 may need to be aligned to the respective out-couplers 104, and in particular to individual pixels 120 of the display panel 101, with a high degree of precision. More details of the light distribution module 102 and the beam spot array generation module 106 will be provided further below.

Figure 2A:
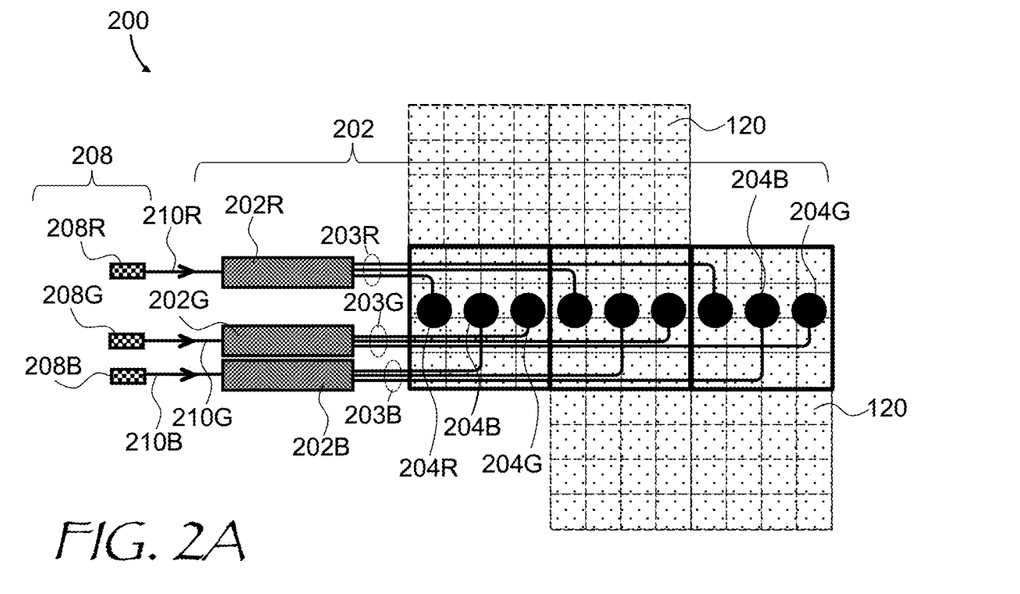
FIG. 2A is a schematic top view of a multi-color lighting unit variant.
Figure 2B:
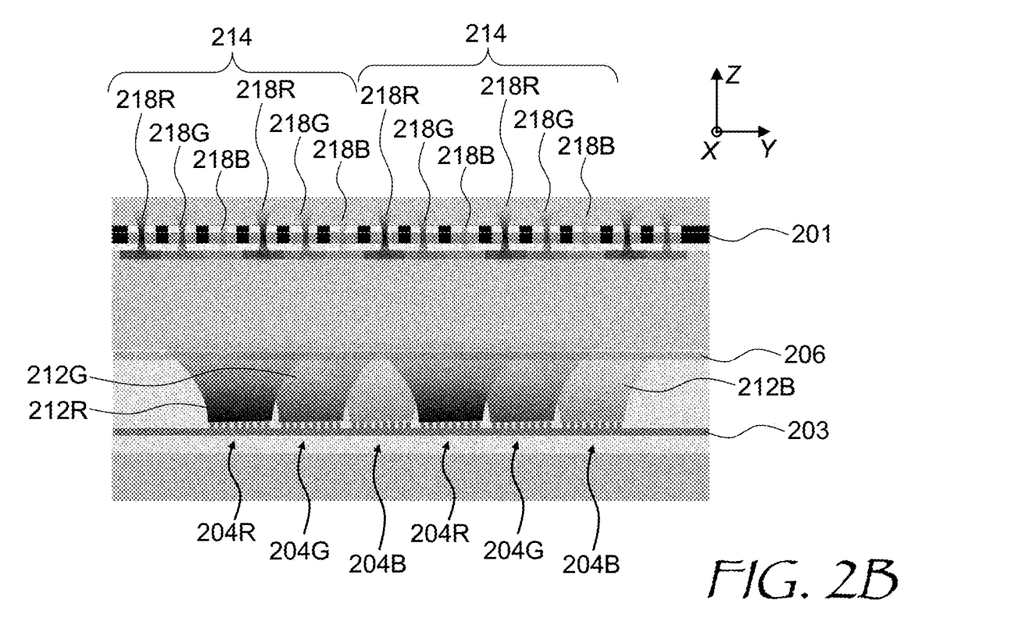
FIG. 2B is a side cross-sectional view of the lighting unit of FIG. 2A.

Referring to FIGS. 2A and 2B, a lighting unit 200 is an embodiment of the lighting unit 100 of FIG. 1, and includes similar elements. A light distribution module 202 of the lighting unit 200 seen in FIG. 2A includes separate light distribution units 202R, 202G, and 202B for red, green, and blue color channels of the illuminating light respectively. The illuminating light of red 210R, green 210G, and blue 210B color channels may be provided by a light source 208 including red 208R, green 208G, and blue 208B light sources respectively. A subset of the plurality of output waveguides 203R, 203G, and 203B may be provided for each color channel 208R/B/G of the illuminating light, as illustrated. Red 204R, green 204G, and blue 204B out-couplers are coupled to the output waveguides 203R, 203G, and 203B respectively (collectively referred to as 203 in FIG. 2B) for out-coupling corresponding light portions 212R, 212G, and 212B. The light distribution module 202 may have a separate input port for light of every color channel. In embodiments where a single multi-color input is provided, the light distribution module 202 may include a wavelength-selective component or components such as, for example, an arrayed waveguide grating (AWG), a ring resonator, an unbalanced Mach-Zehnder interferometer (MZI), a photonic crystal cavity, or an inverse design-based photonic integrated circuit (PIC), to separate different color channels for propagation in different output waveguides. The tunable redistribution portion of the light distribution module 202 may include a tree of directional couplers, balanced MZIs, etc. A tunable element or elements of the light distribution module 202 may include e.g. an electro-optic material such as lithium niobate, a thermo-optic material, a mechanical moving part, a micro-fluidic channel, and/or a liquid crystal (LC) material for tuning effective refractive index of a waveguide portion, for example. These materials may be used as claddings and/or cores of waveguides of MZI/ring resonators, etc.

Figure 3:
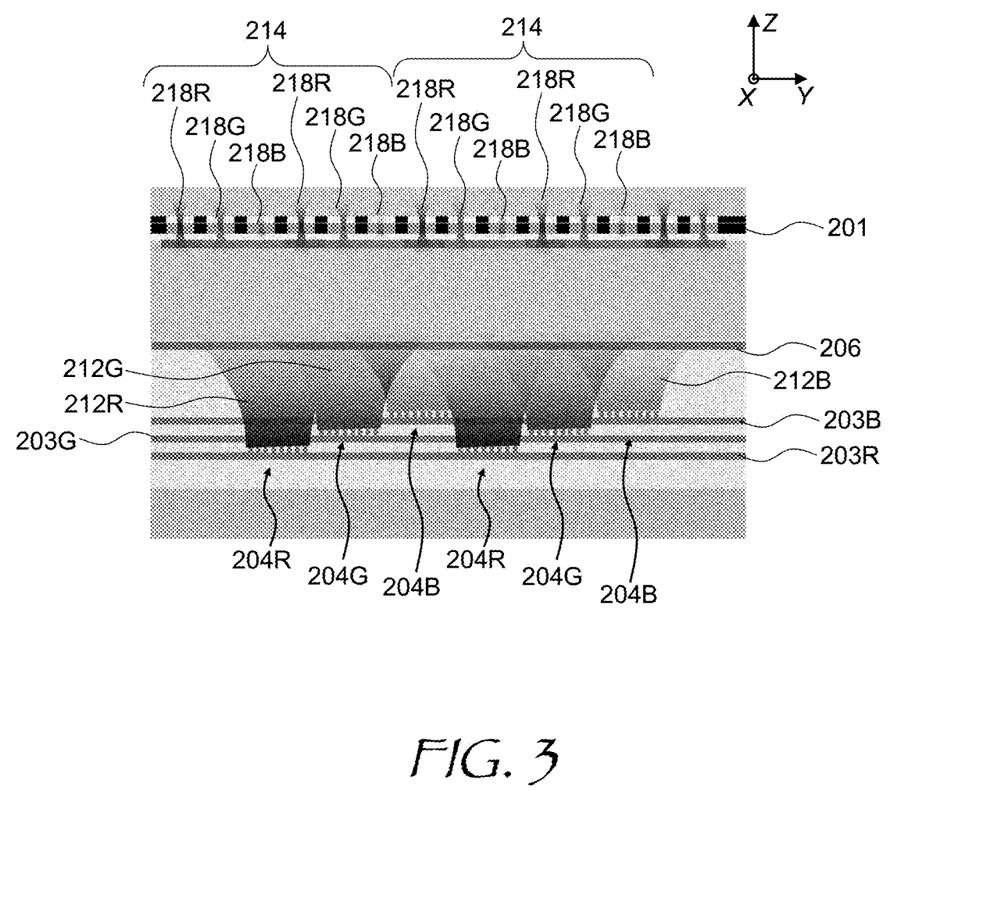
FIG. 3 is a side cross-sectional view of another embodiment of a multi-color lighting unit.

The red 204R, green 204G, and blue 204B out-couplers may be disposed side-by-side at ends of respective output waveguides 203R, 203G, and 203B in XY plane or, alternatively or in addition, one over the other along the thickness dimension as shown in FIG. 3 (i.e. Z-direction in FIG. 3). An illuminating light field 214 provided by a multi-color beam spot array generation module 206 includes three or more interlaced color channel sub-fields 218R, 218G, and 218B for illumination of red, green, and blue sub-pixels of a color display panel 201.

Figure 4:
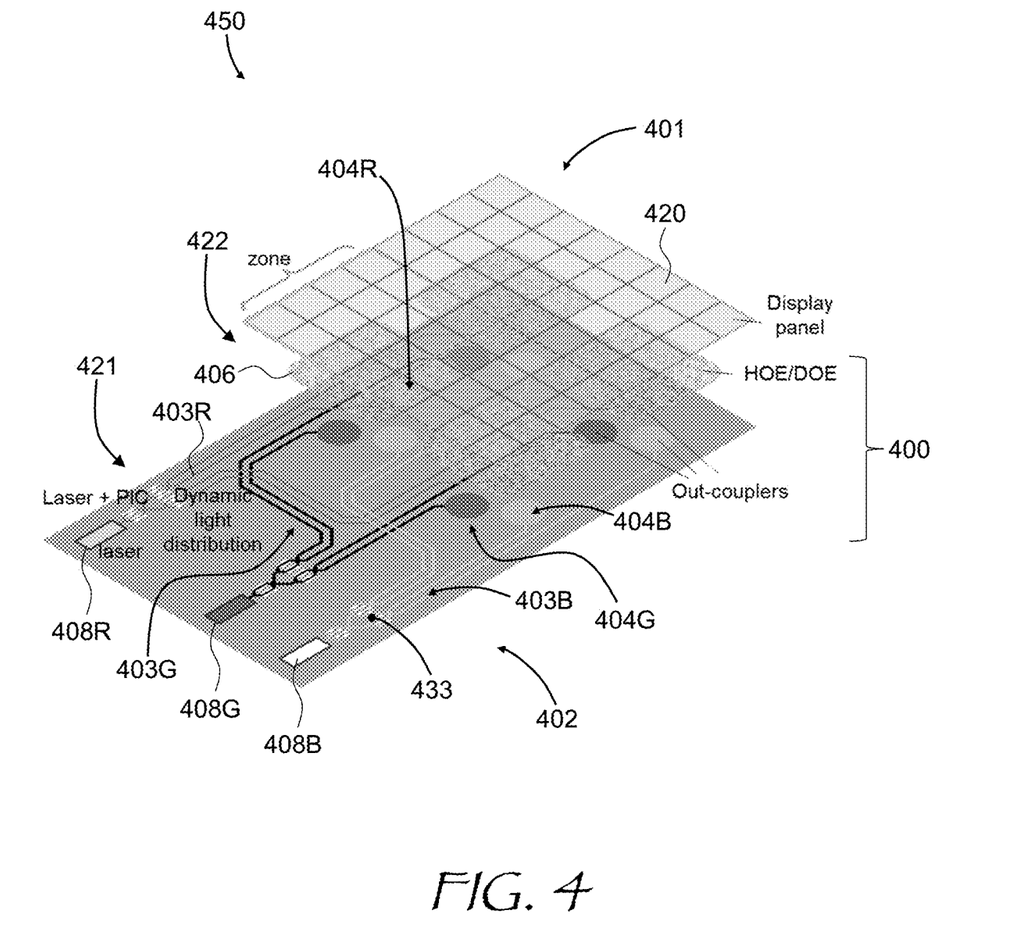
FIG. 4 is an exploded isometric view of a display device with an integrated back-lighting unit of this disclosure.

Referring to FIG. 4, a display device 450 includes a display panel 401 coupled to a lighting unit 400. The display device 450 is shown in an exploded isometric view. The lighting unit 400 is similar to the lighting unit 100 of FIG. 1, 200 of FIGS. 2A and 2B, and includes similar elements. The lighting unit 400 of FIG. 4 includes red 408R, green 408G, and blue 408B laser light sources providing light of red, green, and blue color channels respectively. A light distribution module 402 of the lighting unit 400 is implemented in a photonic integrated circuit (PIC). The light distribution module 402 includes a binary tree of tunable MZIs 433 tunably distributing light of every color channel between corresponding output waveguides, i.e. distributing red color channel light between individual red channel waveguides 403R, distributing green color channel light between individual green channel waveguides 403G, and distributing blue color channel light between individual blue channel waveguides 403B. Each waveguide leads to a corresponding out-coupler; that is, red color channel waveguides 403R lead to red color channel out-couplers 404R, green color channel waveguides 403G lead to green color channel out-coupler 404G, and blue color channel waveguides 403B lead to blue color channel out-coupler 404B.

The lighting unit 400 further includes a holographic optical element (HOE) or, more generally, a diffractive optical element (DOE) 406 that functions as a beam spot array generation module for focusing the illuminating light through individual pixels 420 of the display panel 401, as has been explained above with reference to FIGS. 1, 2A, 2B, and FIG. 3. A metasurface may also be used for this purpose. A metasurface may include a thin layer (e.g. from 20 nanometers to 2 micrometers) of nanostructures comprising two or more materials and minimum feature sizes smaller than a wavelength of impinging light. Such a thin layer with specific arrangement of the features may provide desired optical functionalities including diffraction, refraction, reflection, etc. In the illustrated embodiment, the lighting unit 400 includes a stack of: a first layer 421 including the plurality of output waveguides 403R, 403G, and 403B, and the array of out-couplers 404R, 404G, and 404B; and a second layer 422 including the DOE 406, i.e. the beam spot array generation module.

Figure 5A:
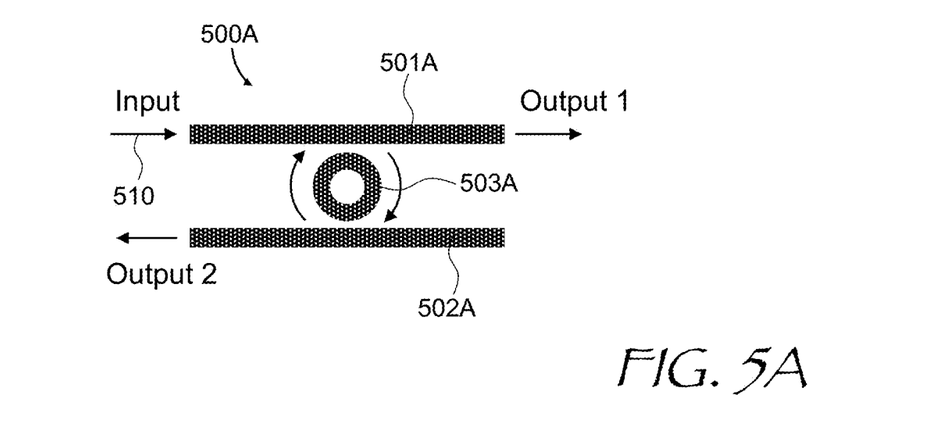
FIG. 5A is a plan schematic view of a ring resonator-based coupler of a light distribution module of a lighting unit of this disclosure.

Turning to FIG. 5A, a ring resonator coupler 500A may be used as a tuning/switching/wavelength-selective element in the light distribution module 102 of FIG. 1 or 202 of FIG. 2A. The ring resonator coupler 500A of FIG. 5A includes first 501A and second 502A waveguides and a waveguide ring 503A between them, evanescently coupled to the first 501A and second 502A waveguides on both sides as illustrated. In operation, light 510 is in-coupled into the first waveguide 501A. A portion of the light 510 is evanescently coupled to the waveguide ring 503A. A portion of the light 510 at a resonant wavelength of the waveguide ring 503A keeps growing, and is out-coupled into the second waveguide 502A. The evanescent coupling may be controlled by providing heaters at evanescent coupling regions between the first 501A and second 502A waveguides on one hand, and the waveguide ring 503A on the other. The resonant wavelength of the waveguide ring 503A may be tuned by heating the waveguide ring 503A. Thus, the light 510 can be redistributed, depending on wavelength, between Output 1 and Output 2 of the ring resonator coupler 500A.

Figure 5B:
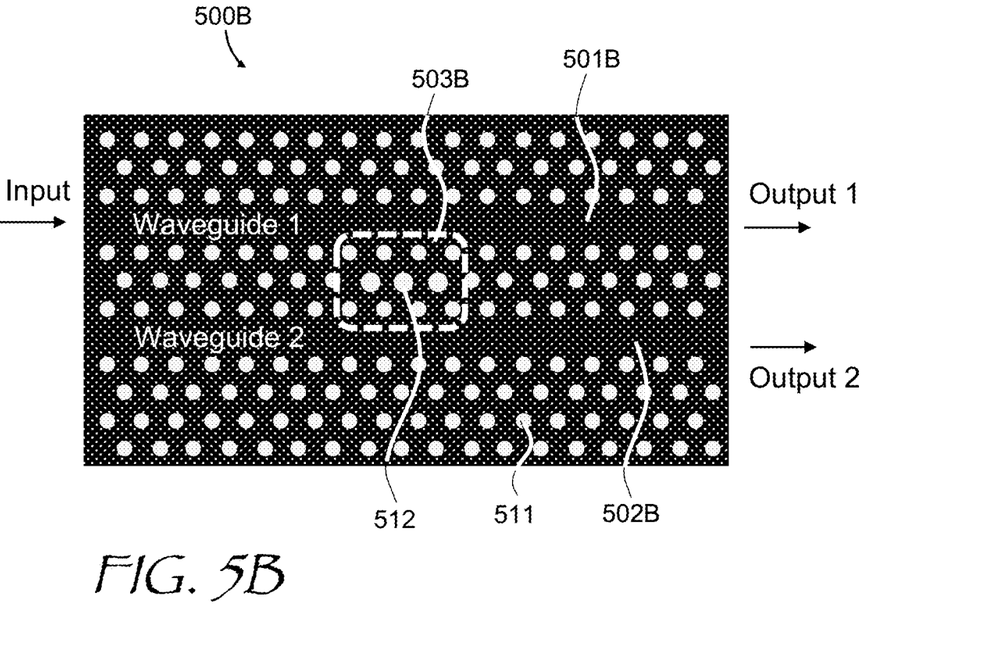
FIG. 5B is plan schematic view of a photonic crystal based coupler implementation.

Referring now to FIG. 5B, a photonic crystal coupler 500B may be used as a tuning/switching/wavelength-selective element in the light distribution module 102 of FIG. 1 or 202 of FIG. 2A. The photonic crystal coupler 500B of FIG. 5B includes first 501B and second 502B photonic crystal waveguides formed by gaps between first nanostructures 511 and a photonic crystal resonator 503B between the first 501B and second 502B photonic crystal waveguides. The photonic crystal resonator 503B is formed in an area of second nanostructures 512 outlined with a white dashed rectangle. The photonic crystal resonator 503B is evanescently coupled to the first 501B and second 502B photonic crystal waveguides. In operation, the light 510 is in-coupled into the first photonic crystal waveguide 501B. A portion of the light 510 is evanescently coupled to the photonic crystal resonator 503B. A portion of the light 510 at a resonant wavelength of the photonic crystal resonator 503B keeps growing, and is out-coupled into the second photonic crystal waveguide 502B. The evanescent coupling may be controlled by providing heaters at evanescent coupling regions between the first 501A and second 502A photonic crystal waveguides on one hand, and the photonic crystal resonator 503B on the other. The resonant wavelength may be tuned by heating the photonic crystal resonator 503B. Thus, the light 510 can be redistributed, depending on wavelength, between Output 1 and Output 2 of the photonic crystal coupler 500B.

Figure 6:
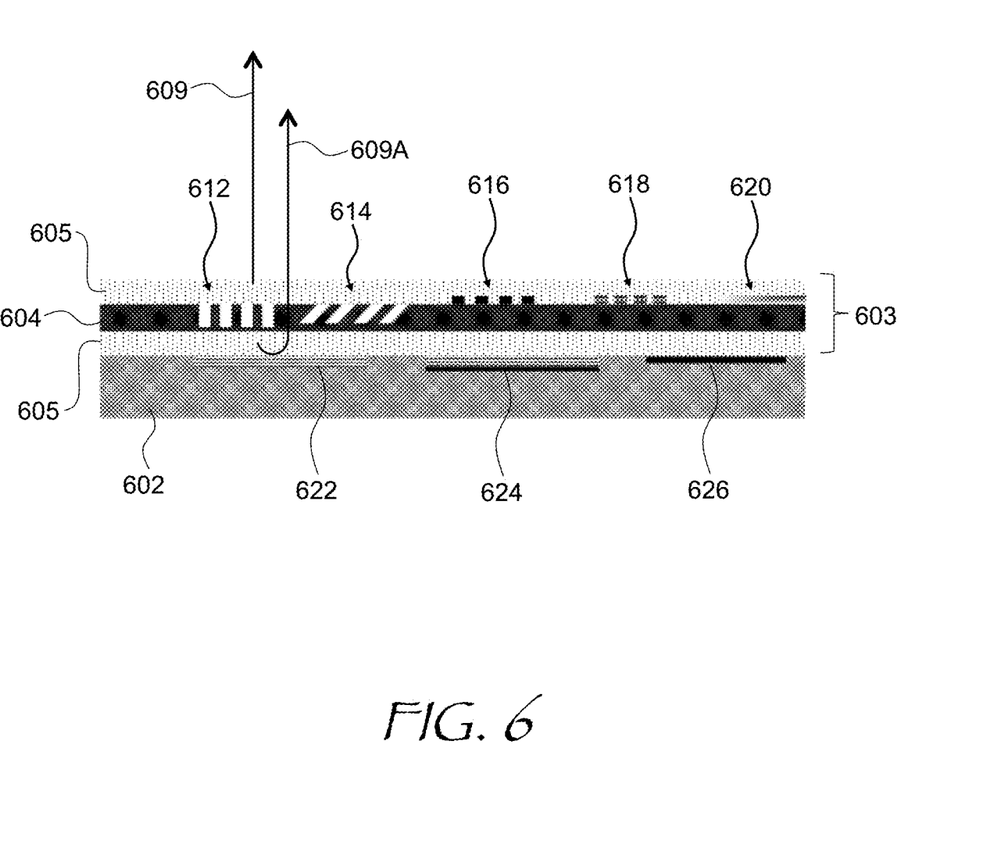
FIG. 6 is a side cross-sectional view of some of waveguide out-coupler embodiments of a lighting unit.

Illustrative embodiments of the out-couplers 104 of FIG. 1, 204R, 204G, 204B of FIGS. 2A, 2B and FIG. 3, and 404R, 404G, 404B of FIG. 4 are presented in FIG. 6. The out-couplers may include e.g. straight 612 and/or slanted 614 grating structures formed in a core 604 and/or a cladding 605 of output waveguides 603, e.g. by etching. The waveguides 603 are formed on, and supported by, a substrate 602. The out-couplers may include scattering features 616, metamaterial gratings and/or metamaterial arrays of scatterers 618, and/or holographic optical elements or liquid crystal volume gratings 620. Herein, the term "metamaterial" refers to a spatial arrangement of small (sub-wavelength) geometries of dielectric and semiconductor, dielectric and metal, or dielectric, semiconductor, and metal, configured to provide desired optical properties such as refractive index, optical dispersion, reflection or transmission, etc.

A full reflector may be supported by the substrate 602 under the output waveguides to reflect a fraction 609A of out-coupled light portions 609 in the direction of the substrate 602, as illustrated. The full reflector may include a dielectric high reflector (HR) coating 622, a dielectric and metallic HR coating 624, a purely metallic HR coating 626, etc.

Figure 7:
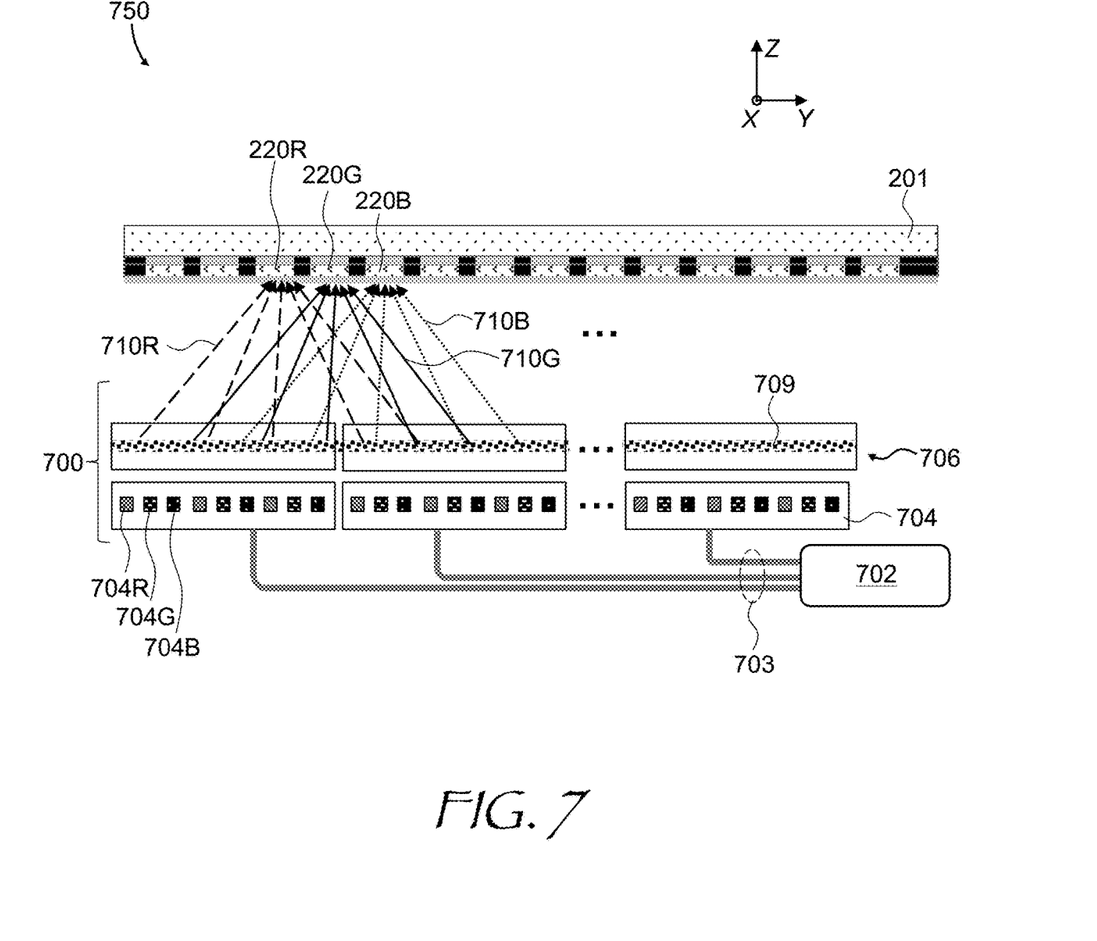
FIG. 7 is a schematic side cross-sectional view of a display device of this disclosure including a multi-color beam spot array generation module.

Referring to FIG. 7, a display device 750 includes the display panel 201 including arrays of red 220R, green 220G, and blue 220B sub-pixels. The display panel 201 is coupled to a lighting unit 700 (FIG. 7) for illuminating the display panel 201. The lighting unit 700 includes a light distribution module 702 having a plurality of output waveguides 703 for configurably distributing illuminating light between the output waveguides 703. Each output waveguide 703 is coupled to an out-coupler patch 704, which is configured to out-couple a portion of the illuminating light to propagate towards the display panel 201. To that end, each out-coupler patch 704 may include a sub-array of red color channel out-couplers 704R, a sub-array of green color channel out-couplers 704G, and a sub-array of blue color channel out-couplers 704B. Each out-coupler 704R, 704G, and 704B out-couples the illuminating light of a corresponding color channel, i.e. the red color channel out-couplers 704R out-couple red color channel illuminating light 710R, the green color channel out-couplers 704G out-couple green color channel illuminating light 710G, and the blue color channel out-couplers 704B out-couple blue color channel illuminating light 710B.

The illuminating light 710R, 710G, and 710B impinges onto a beam spot array generation module 706 comprising an array of diffractive optical elements 709, e.g. holographic elements, which are configured to convert each the illuminating light of each color channel 710R, 710G, and 710B to illuminate a zone of the display panel with an illuminating light field comprising an array of laterally offset light spots. Each light spot is configured to illuminate an individual color sub-pixel 220R, 220G, and 220B respectively, of the zone of the display panel 201. As illustrated in FIG. 7, neighboring zones may overlap with one another, providing smooth inter-zonal transitions of the illuminating light field.

Figure 8:
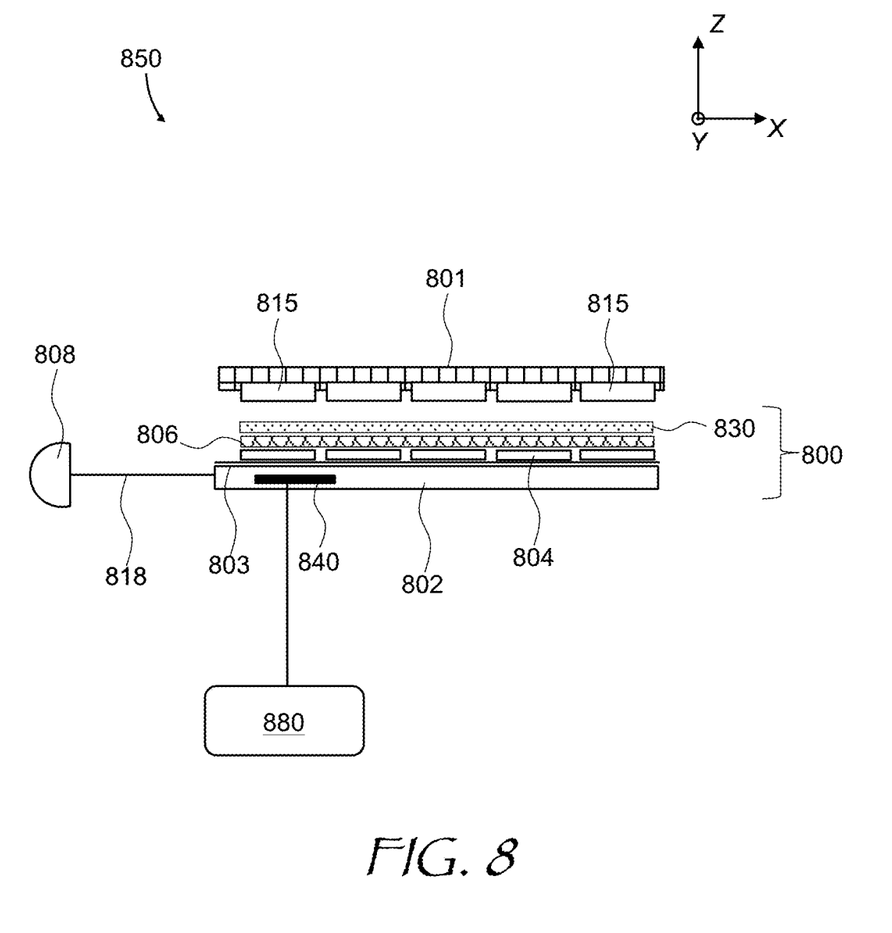
FIG. 8 is a schematic view of a display device using a lighting unit equipped with a phase modulator for scrambling optical phase of the illuminating light fields.

Turning to FIG. 8, a display device 850 includes a display panel 801 coupled to a lighting unit 800 illuminating the display panel 801. The lighting unit 800 may include any of the lighting units considered herein. In the example shown, the lighting unit 800 includes a light source 808 optically coupled to a light distribution module 802 having a plurality of output waveguides 803 for configurably distributing illuminating light between the output waveguides 803. Each waveguide 803 is coupled to an out-coupler 804. An array of the out-couplers 804 is configured to out-couple portions of the illuminating light to propagate towards the display panel 801. Depending on type of out-coupler, each out-coupled portion of the illuminating light may be contiguous, i.e. may be a continuous light field with no areas of zero intensity.

A beam spot array generation module 806 is configured to receive portions of the out-coupled illuminating light and to convert the portions to illuminate zones 815 of the display panel 801 with an illuminating light field comprising an array of light spots, each light spot being configured for illuminating an individual pixel or sub-pixel of the zone 815 of the display panel 801.

A phase scrambler 830 is disposed downstream of the beam spot array generation module 806. The phase scrambler 830 is configured for scrambling relative optical phase of the illuminating light fields between different zones 815 of the display panel 801. The phase scrambler 830 may include e.g. a phase modulator that temporally modulates phase of the illuminating light to reduce mutual coherence of illuminating light of neighboring zones 815. The phase scrambling facilitates the suppression of optical interference or fringing effects in border areas between neighboring zones 815 when coherent illuminating light is used. Thus, the phase scrambling facilitates the smooth illumination of the display panel 801.

The light source 808 may include e.g. a laser diode, a fiber laser, a vertical cavity surface-emitting laser (VCSEL), a heterogeneously integrated laser, a superluminescent light-emitting diode (SLED), and/or a non-linearly converted light source using sum-frequency generation, difference frequency generation, second harmonic generation, parametric amplification, and/or four wave mixing. The light source 808 may be coupled to the light distribution module 802 by a connector 818 such as, for example, an optical fiber, a nanowire, a photonic wire, a micro-optical coupling assembly, a free-space edge coupler, and/or a waveguide grating coupler.

The display device 850 may further include a controller 880 for tuning a tunable element 840 of the light distribution module 802 to provide configurable zonal illumination to the display panel 801. The tunable element 840 may include e.g. an electro-optic material, a thermo-optic material, a mechanical moving part, a micro-fluidic channel, an LC material, etc.

Figure 9A:
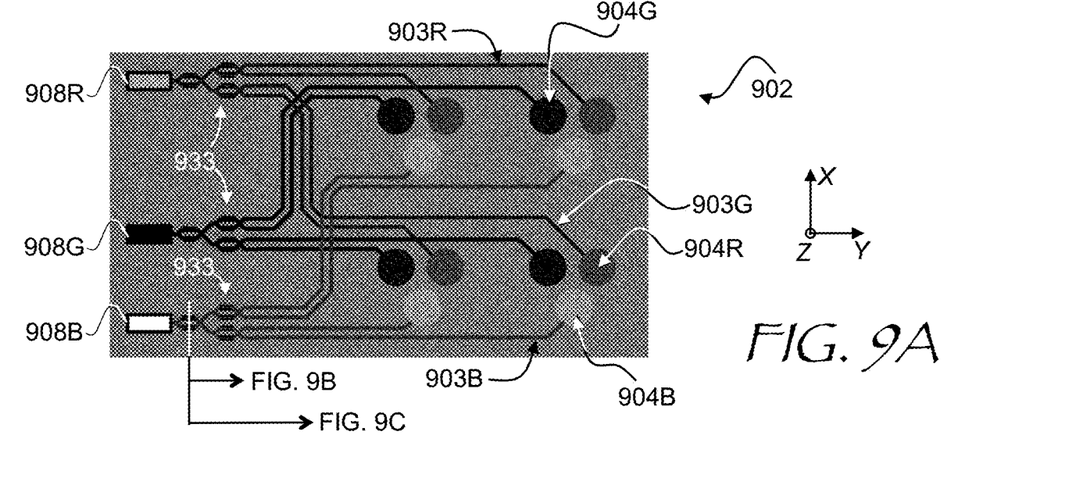
FIG. 9A is a top view of a photonic integrated circuit-based light distribution module using an array of Mach-Zehnder interferometer (NMI) beamsplitters.

Referring to FIG. 9A, a PIC-implemented light distribution module 902 is similar to the light distribution module 402 of FIG. 4, and includes similar elements. The PIC-implemented light distribution module 902 includes red 908R, green 908G, and blue 908B semiconductor light sources each coupled to a binary tree of tunable MZIs 933 distributing light of every color channel between individual output waveguides, i.e. distributing red color channel light between individual red channel waveguides 903R, distributing green color channel light between individual green channel waveguides 903G, and distributing blue color channel light between individual blue channel waveguides 903B. Each waveguide leads to a corresponding out-coupler, i.e. red color channel waveguides 903R lead to red color channel out-couplers 904R, green color channel waveguides 903G lead to green color channel out-coupler 904G, and blue color channel waveguides 903B lead to blue color channel out-coupler 904B.

Figure 9B:
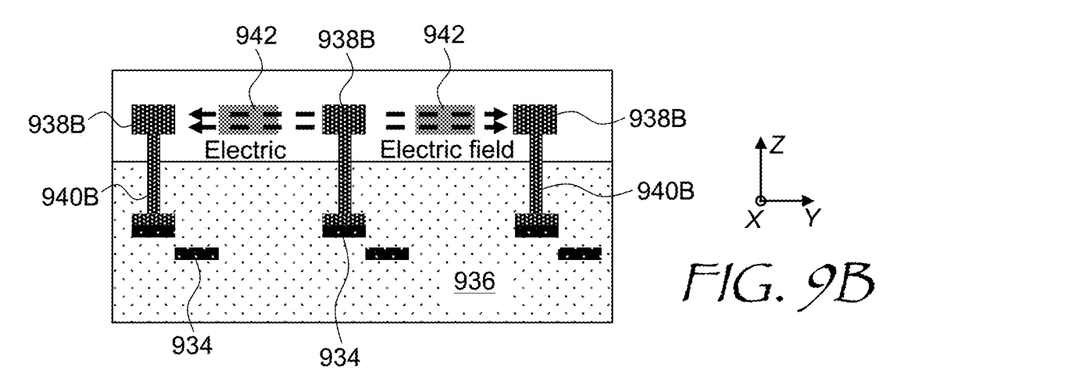
FIG. 9B is a side cross-sectional view of the light distribution module of FIG. 9A including integrated electronic circuitry with in-plane electric field control.
Figure 9C:
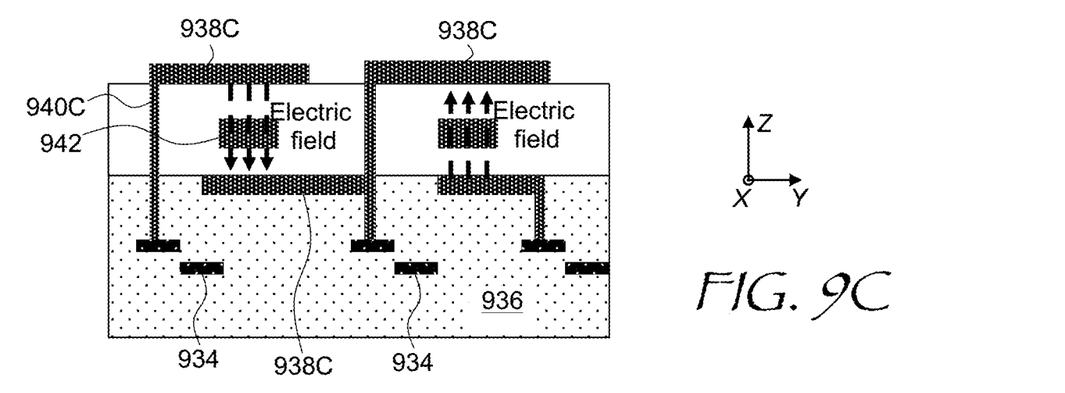
FIG. 9C is a side cross-sectional view of the light distribution module of FIG. 9A including integrated electronic circuitry with vertical electric field control.

The PIC-implemented light distribution module 902 includes integrated controller circuitry for tuning tunable element(s) of the MZIs 933 to provide configurable zonal illumination to a display panel. One implementation of such circuitry is illustrated in FIG. 9B, which is a cross-sectional view across one of the MZIs 933 (a bottom one, coupled to the blue semiconductor light source 908B). Electronic gates 934 are supported by/formed in/formed on a substrate 936. The electronic gates 934 are electrically coupled to electrodes 938B by vias 940B. The electrodes 938B are disposed horizontally w.r.t. cores 942 of the MZI 933. Another implementation is shown in FIG. 9C, in a same cross-sectional view. In FIG. 9C, the electronic gates 934 are electrically coupled to electrodes 938C by vias 940C. The electrodes 938C are disposed vertically w.r.t. the cores 942 of the MZI 933.

Figure 10:
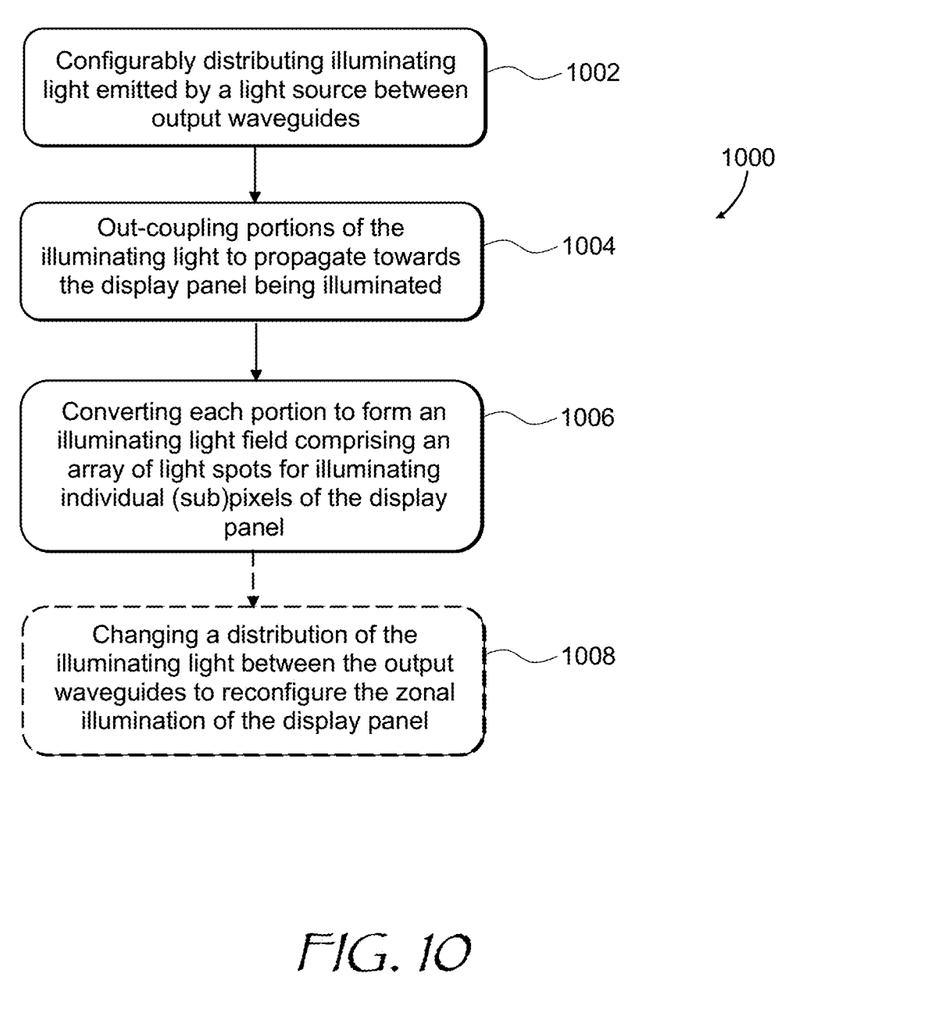
FIG. 10 is a flowchart of a method for zonal illumination of a display panel.

Referring to FIG. 10 with further reference to FIGS. 1A and 1B, a method 1000 for zonal illumination of a display panel includes configurably distributing (1002) illuminating light between output waveguides of a plurality of output waveguides, e.g. distributing the illuminating light 110 between the output waveguides 103 using the light distribution module 102 (FIG. 1A). A portion of the illuminating light is out-coupled (FIG. 10; 1004) from each output waveguide to propagate towards the display panel, e.g. the contiguous portions 112 may be out-coupled by the out-couplers 104 (FIG. 1). Each out-coupled portion us converted (FIG. 10; 1006) to illuminate a zone of the display panel with an illuminating light field comprising an array of light spots, each light spot configured for illuminating an individual pixel or sub-pixel of the zone of the display panel, as explained above with reference to FIGS. 1A and 1B, 2A and 2B, and FIGS. 3 and 7.

The method 1000 of FIG. 10 may further include changing or tuning (1008) a distribution of the illuminating light between the output waveguides to reconfigure the zonal illumination of the display panel. The distribution of illuminating light may be tuned to adjust to the imagery being displayed. For example, the illuminating light may be reduced or even completely switched off in areas of low image brightness, and may be increased in areas of high image brightness, to increase a perceived contrast of the image being displayed. To provide smooth illumination transit, individual zones may overlap one another.

Figure 11:
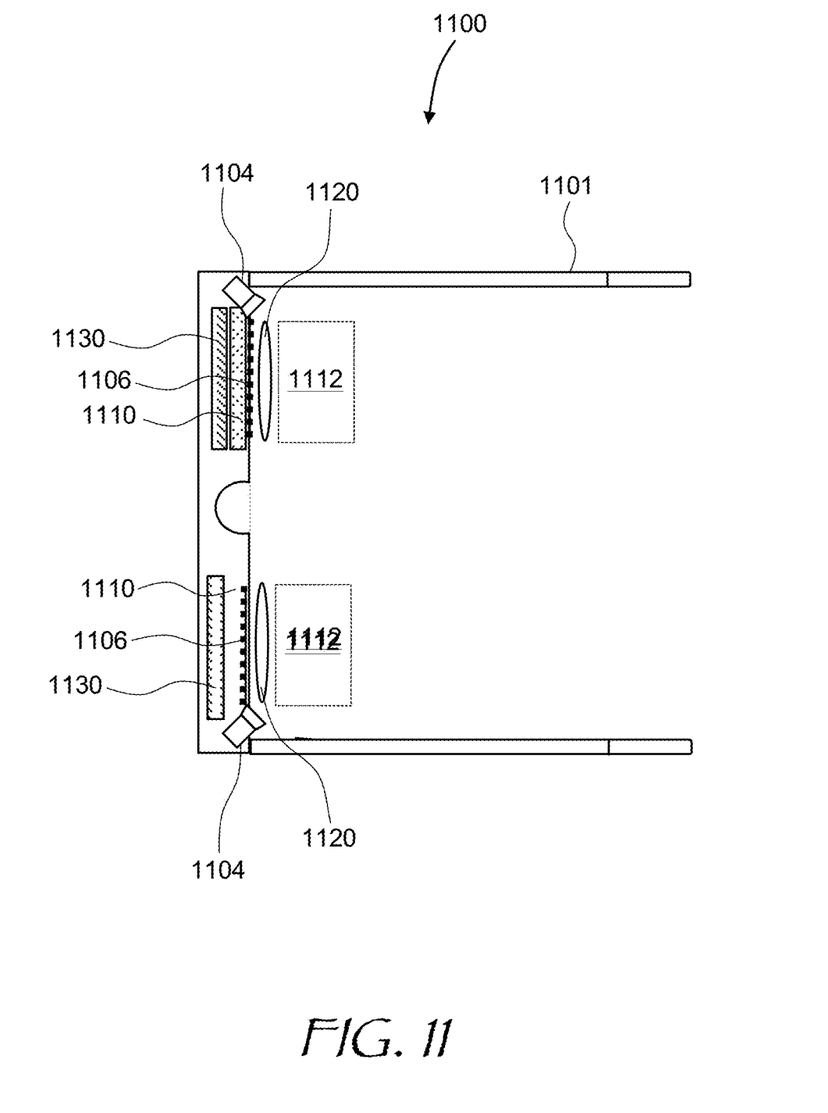
FIG. 11 is a view of a display of this disclosure having a form factor of a pair of eyeglasses.

Turning to FIG. 11, a virtual reality (VR) near-eye display 1100 includes a frame 1101 supporting, for each eye: a lighting unit 1130 including any of the lighting units disclosed herein; a display panel 1110 including an array of light valve display pixels; and an ocular lens 1120 for converting the image in linear domain displayed by the display panel 1110 into an image in angular domain for direct observation by a user's eye, not shown, at an eyebox 1112. A plurality of eyebox illuminators 1106, illustrated as black dots, may be placed around the display panel 1110 on a surface that faces the eyebox 1112. An eye-tracking camera 1104 may be provided for each eyebox 1112.

The purpose of the eye-tracking cameras 1104 is to determine position and/or orientation of both eyes of the user. The eyebox illuminators 1106 illuminate the eyes at the corresponding eyeboxes 1112, allowing the eye-tracking cameras 1104 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1106, the latter may be made to emit light invisible to the user. For example, infrared light may be used to illuminate the eyeboxes 1112.

Figure 12:
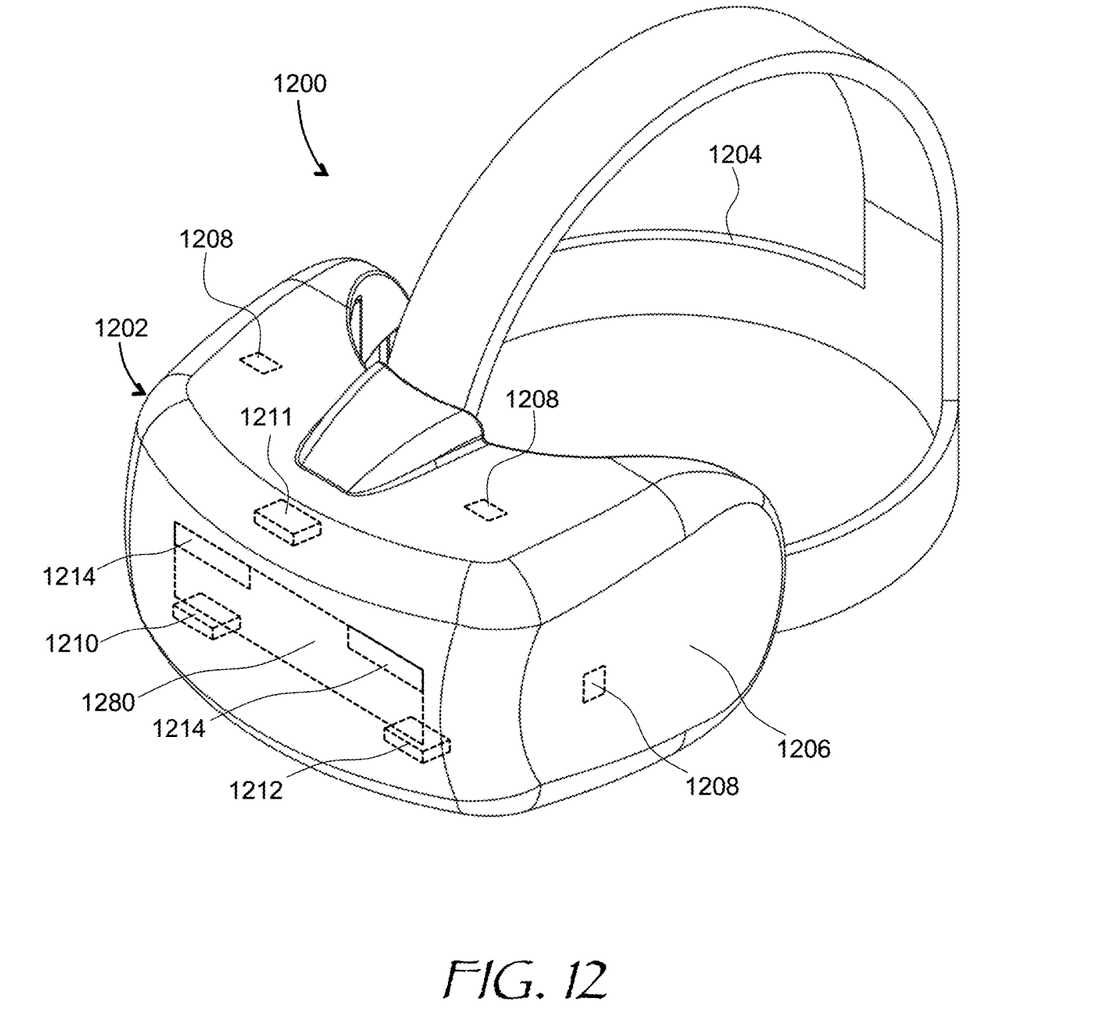
FIG. 12 is a three-dimensional view of a head-mounted display (HMD) of this disclosure.

Referring now to FIG. 12, an HM4D 1200 is an example of an AR/VR wearable display system which encloses the user's face, for a greater degree of immersion into the AR/VR environment. The HMD 1200 may generate the entirely virtual 3D imagery. The HMD 1200 may include a front body 1202 and a band 1204 that can be secured around the user's head. The front body 1202 is configured for placement in front of eyes of a user in a reliable and comfortable manner. A display system 1280 may be disposed in the front body 1202 for presenting AR/VR imagery to the user. The display system 1280 may include any of the lighting units or display devices disclosed herein. Sides 1206 of the front body 1202 may be opaque or transparent.

In some embodiments, the front body 1202 includes locators 1208 and an inertial measurement unit (IMU) 1210 for tracking acceleration of the HMD 1200, and position sensors 1212 for tracking position of the HMD 1200. The IMU 1210 is an electronic device that generates data indicating a position of the HMD 1200 based on measurement signals received from one or more of position sensors 1212, which generate one or more measurement signals in response to motion of the HMD 1200. Examples of position sensors 1212 include: one or more accelerometers, one or more gyroscopes, one or more magnetometers, another suitable type of sensor that detects motion, a type of sensor used for error correction of the IMU 1210, or some combination thereof. The position sensors 1212 may be located external to the IMU 1210, internal to the IMU 1210, or some combination thereof.

The locators 1208 are traced by an external imaging device of a virtual reality system, such that the virtual reality system can track the location and orientation of the entire HMD 1200. Information generated by the IMU 1210 and the position sensors 1212 may be compared with the position and orientation obtained by tracking the locators 1208, for improved tracking accuracy of position and orientation of the HMD 1200. Accurate position and orientation is important for presenting appropriate virtual scenery to the user as the latter moves and turns in 3D space.

The HMD 1200 may further include a depth camera assembly (DCA) 1211, which captures data describing depth information of a local area surrounding some or all of the HMD 1200. The depth information may be compared with the information from the IMU 1210, for better accuracy of determination of position and orientation of the HMD 1200 in 3D space.

The HMD 1200 may further include an eye tracking system 1214 for determining orientation and position of user's eyes in real time. The obtained position and orientation of the eyes also allows the HMD 1200 to determine the gaze direction of the user and to adjust the image generated by the display system 1280 accordingly. The determined gaze direction and vergence angle may be used to adjust the display system 1280 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A lighting unit for a display panel, the lighting unit comprising:
   a light distribution module comprising a plurality of output waveguides for configurably distributing illuminating light therebetween;
   an array of out-couplers, wherein each out-coupler is coupled to an output waveguide of the plurality of output waveguides and configured to out-couple a portion of the illuminating light to propagate towards the display panel; and
   a beam spot array generation module configured to receive portions of the illuminating light out-coupled by out-couplers of the array of out-couplers, and to convert each portion to illuminate a zone of the display panel with an illuminating light field comprising an array of light spots, wherein each light spot is configured for illuminating an individual pixel or sub-pixel of the zone of the display panel.

2. The lighting unit of claim 1, wherein the array of light spots of each illuminating light field comprises at least 9 light spots.

3. The lighting unit of claim 1, wherein the plurality of output waveguides of the light distribution module comprises at least one of: a rib waveguide, a ridge waveguide, a slot waveguide, an ARROW waveguide, a strip-loaded waveguide, a buried waveguide, a laser-written waveguide, an ion-diffusion waveguide, a holographically defined waveguide, or a multilayer waveguide for transversely confining light field to propagate along a pre-defined direction.

4. The lighting unit of claim 1, wherein the light distribution module comprises at least one of: a fiber-based beam splitter, an on-chip star coupler, a multimode interference (MMI) coupler, a Mach-Zehnder interferometer (MZI) coupler, a Y-splitter, a resonator based coupler, or a photonic crystal based coupler.

5. The lighting unit of claim 1, wherein the light distribution module comprises a subset of the plurality of output waveguides for each color channel of a plurality of color channels of the illuminating light.

6. The lighting unit of claim 5, wherein the light distribution module comprises at least one of: an arrayed waveguide grating (AWG), a directional coupler, a ring resonator, an unbalanced Mach-Zehnder interferometer (MZI), a photonic crystal cavity, or an inverse design-based photonic integrated circuit (PIC).

7. The lighting unit of claim 1, wherein the light distribution module comprises at least one tunable element comprising at least one of: an electro-optic material, a thermo-optic material, a mechanical moving part, a micro-fluidic channel, or a liquid crystal (LC) material.

8. The lighting unit of claim 1, wherein the beam spot array generation module comprises at least one of: a diffractive optical element, a metasurface, a holographic optical element, or a polarization volume holographic element.

9. The lighting unit of claim 1, comprising a stack of: a first layer comprising the plurality of output waveguides and the array of out-couplers; and a second layer comprising the beam spot array generation module.

10. The lighting unit of claim 1, further comprising a phase scrambler downstream of the beam spot array generation module for scrambling optical phase of the illuminating light fields between different zones of the display panel.

11. The lighting unit of claim 1, wherein each out-coupled portion of the illuminating light is contiguous.

12. A display device comprising:
a display panel comprising a plurality of light valve pixels; and
a lighting unit for illuminating the display panel, the lighting unit comprising:
a light distribution module comprising a plurality of output waveguides for configurably distributing illuminating light therebetween;
an array of out-couplers, wherein each out-coupler is coupled to an output waveguide of the plurality of output waveguides and configured to out-couple a portion of the illuminating light to propagate towards the display panel; and
a beam spot array generation module configured to receive portions of the illuminating light out-coupled by out-couplers of the array of out-couplers and to convert each portion to illuminate a zone of the display panel with an illuminating light field comprising an array of light spots, wherein each light spot is configured for illuminating an individual pixel or sub-pixel of the zone of the display panel.

13. The display device of claim 12, further comprising a light source for providing the illuminating light to the light distribution module, the light source comprising at least one of: a laser diode, a fiber laser, a vertical cavity surface-emitting laser (VCSEL), a heterogeneously integrated laser, a superluminescent light-emitting diode (SLED), or a non-linearly converted light source.

14. The display device of claim 13, further comprising a connector coupling the light source to the light distribution module, the connector comprising at least one of: an optical fiber, a photonic wire, a nanowire, a free-space edge coupler, a micro-optical coupling assembly, or a waveguide grating coupler.

15. The display device of claim 12, wherein each out-coupled portion of the illuminating light is contiguous.

16. The display device of claim 12, wherein the light distribution module comprises a tunable element comprising at least one of: an electro-optic material, a thermo-optic material, a mechanical moving part, a micro-fluidic channel, or a liquid crystal (LC) material.

17. The display device of claim 16, further comprising controller circuitry for tuning the tunable element to provide configurable zonal illumination to the display panel, wherein the controller circuitry is integrated into the light distribution module.

18. A method for zonal illumination of a display panel, the method comprising:
configurably distributing illuminating light between output waveguides of a plurality of output waveguides;
out-coupling a portion of the illuminating light from each output waveguide to propagate towards the display panel; and
converting each out-coupled portion to illuminate a zone of the display panel with an illuminating light field comprising an array of light spots, each light spot configured for illuminating an individual pixel or sub-pixel of the zone of the display panel.

19. The method of claim 18, further comprising changing a distribution of the illuminating light between the output waveguides to reconfigure the zonal illumination of the display panel.

20. The method of claim 18, wherein the zones of the display panel overlap one another.

* * * * *